Sept. 11, 1934.  E. B. THOMAS  1,973,028
FISHING FLOAT
Filed Aug. 16, 1932
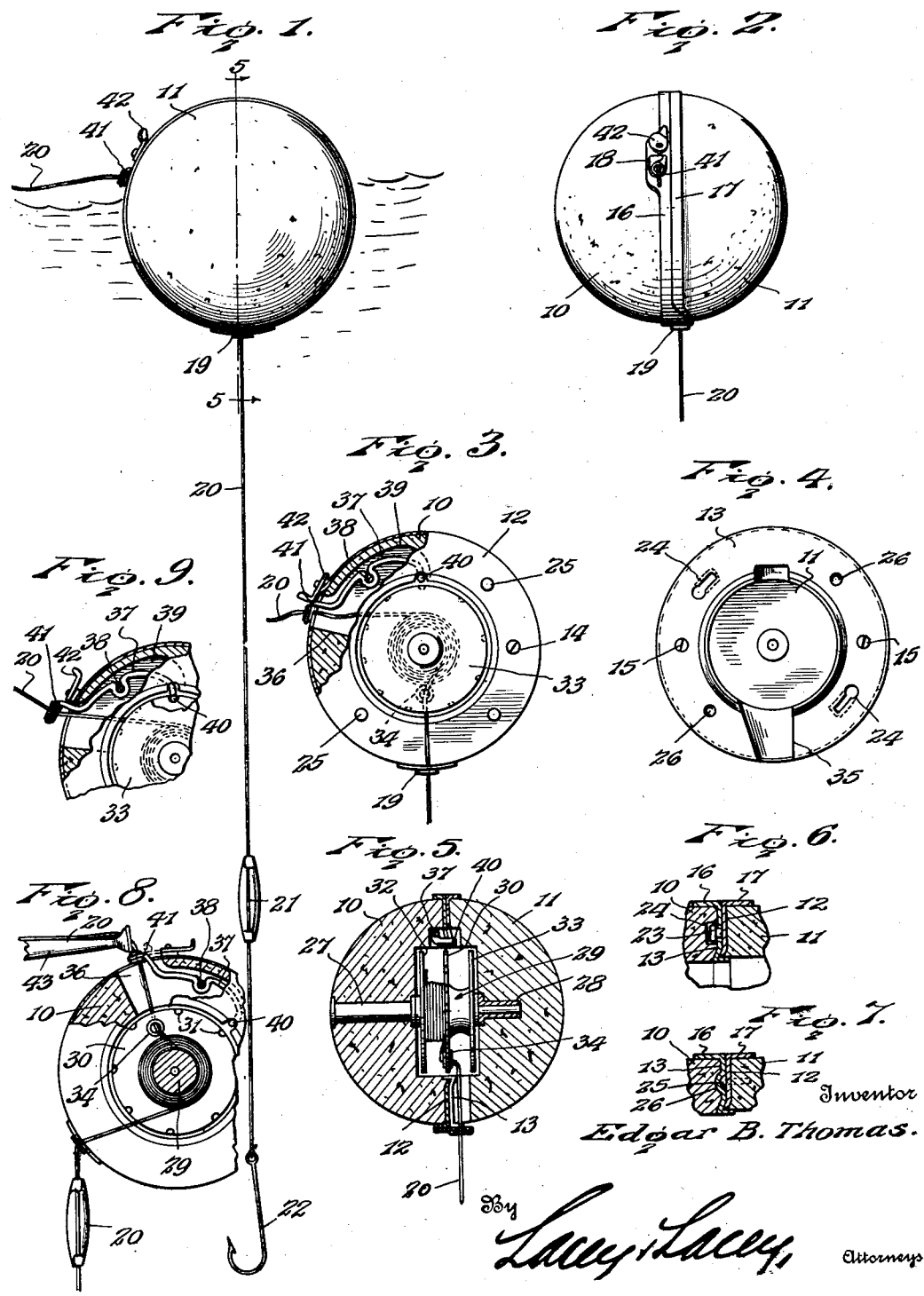
Inventor
Edgar B. Thomas.
By Lacey & Lacey,
Attorneys Patented Sept. 11, 1934

1,973,028

UNITED STATES PATENT OFFICE 1,973,028

FISHING FLOAT

Edgar B. Thomas, Connersville, Ind.

Application August 16, 1932, Serial No. 629,070

3 Claims. (Cl. 43—51)

This invention relates to fishing floats and has for an object to provide a float to be used with a bait-casting rod and which will let out the amount of line desired for depth, when the cast is made.

A further object is to provide a float having a novel brake which will lock the double pulley in the float stationary to maintain the proper amount of line to the sinker, desired for depth, in case wind or current moves the float sufficiently to tend to cause the pulley to wind up, thus the fisher may be assured of the proper amount of line being used for depth until the bait is retrieved.

A further object is to provide a float having an upper guide which will, at all times, tend to let the fishing line on the water level enter the pulley in such a manner as to promote free easy working of the pulley so that the line will not be broken nor will sharp bends be produced to impede the action of the device.

A further object is to provide a sectional float formed of two complementary halves, one of which carries all of the working parts so that the latter will be easily accessible for inspection, repairs and threading the fishing line thereon to obtain the proper depth from the float to the sinker.

A further object is to provide a fishing float which will be formed of a few simple, inexpensive, strong and durable parts that will not easily get out of order.

Other objects of the invention, not mentioned in the foregoing, will appear hereinafter.

In the accompanying drawing forming part of this specification,

Figure 1 is a side elevation of the float in use,

Figure 2 is a front elevation of the float,

Figure 3 is a side elevation of one section of the float,

Figure 4 is a side elevation of the complementary section of the float,

Figure 5 is a cross section taken on the line 5—5 of Figure 1,

Figure 6 is a detail section showing one of the locking lugs and its keyhole,

Figure 7 is a detail section showing one of the snap fasteners.

Figure 8 is a detail section showing the brake released by the tip of the casting rod, and Figure 9 is a detail section showing the brake locked by the tensioned fishing line.

Referring now to the drawing in which like characters of reference designate similar parts in the various views the float is shown to comprise two hollow complementary hemispherical sections 10 and 11 which may be formed of cork, aluminum, or any light material. Sheet metal facing rings 12 and 13 are secured to the opposed inner faces of the sections by screws 14 and 15, as shown in Figures 3 and 4.

The rings have exterior flanges 16 and 17 which protect the outer surface of the corresponding sections, as shown in Figure 2, and the flange of the ring 16 is provided with an opening 18 and also with a guide eye 19 disposed about 90° apart through which the fishing line 20 respectively enters the float and passes out therefrom, as shown in Figure 3. It is important that the openings 18 and 19 be so arranged, as shown in Figure 1, that the fishing line may enter the float naturally at the water level and may pass naturally downward therefrom to the sinker 21 which, as usual, is disposed at the fish hook 22.

The sections 10 and 11 are removably held together by a pair of studs or lugs 23 carried by the ring 12, as shown in Figure 6, entering keyholes 24 preferably of the shape shown, although not essentially so. The lugs enter the round ends of the keyhole, as usual, and by a twisting movement of the sections oppositely to each other they pass into the straight ends of the keyholes. A pair of stop pins 25, of the general shape shown in Figure 7, are carried by the ring 12 and snap into depressions 26, carried by the ring 13 when the studs are lodged in the keyholes.

As shown best in Figure 5, an axle 27 is fixed at one end in the section 10 and projects beyond the section where it is removably received in a sleeve bearing 28 carried by the section 11. Rotatably mounted on the axle is a double pulley 29. The center flange 30 of the pulley is provided on the edge with a plurality of notches 31, as shown in Figure 8, while the end flanges 32 and 33 are plain disks. The pulley is received in the chamber formed by the hollow interiors of both sections of the float, and is of sufficient diameter to permit the amount of line desired for the depth to fish, being wound by hand on the right hand channel of the pulley prior to attaching the sinker and hook to prepare for fishing.

In practice, the number of turns wound on the pulley corresponds to the length of line desired to extend from the float to the sinker when the float rests on the water. Gravitation of the sinker unwinds the line off the righthand channel of the pulley, as shown in Figure 5, and rotates the pulley to wind an equal length on the lefthand channel of the pulley. Conversely, unwinding of the line off the lefthand channel of the pulley rotates the pulley to wind the line on the righthand channel of the pulley, as shown in Figure 8, and lift the sinker to the float.

By referring to Figures 3, 5 and 9, it will be seen that a gromet 34 is disposed in the center flange 30 of the pulley near the edge thereof. The line is threaded from one side of the pulley through this gromet to the other side of the pulley. As shown in these figures, the gromet forms a bight in the line which holds the pulley stationary at its limit of rotary movement in either direction. The gromet also permits of sufficient length of line being drawn from the casting rod to wind on the righthand channel of the pulley for providing the desired depth at which the bait will hang below the float.

It will be noted by referring to Figures 4 and 5 that a radial slot 35 is formed in the section 11 to permit the line passing from the float freely without obstruction. By referring to Figure 3, it will be seen that, likewise, the section 10 is formed with a radial slot 36 which permits the line to enter the float freely and naturally without obstruction.

It will be evident that when the righthand channel of the pulley is free of turns and the opposite side is wound up, any pull upon the fishing line will tend to rotate the pulley and wind up the depth portion of the line. This might accidentally be caused by strong winds or water currents. To prevent such an occurrence and assure the bait being disposed at the desired depth at all times, a rocker arm or brake 37 is mounted on a stub shaft 38 which projects transversely through a recess 39 in the section 10 of the float, which recess communicates with the slot 36 of the section.

The rocker arm is pivoted intermediate its ends on the shaft and one end is provided with a detent 40 which is adapted to seat in the notches 31 in the edge of the center flange 30 of the pulley and lock the pulley stationary. The opposite end of the rocker arm passes through the slot 36 and terminates in an eye 41 which guides the fishing line to the pulley.

By now comparing Figures 3 and 9, it will be seen that when the line 20 is slack in the normal natural position of the float on the water the brake will be rocked to released position by the weight of the eye 41. Should, however, strong currents or heavy breezes tend to make the line 20 taut, such tightening of the line will rock the brake on its pivot, as shown in Figure 9, and dispose the detent 40 in one of the notches of the pulley and positively prevent rotation of the pulley to wind up the depth portion of the line. It will be observed that the action of the brake, under such conditions, is automatic.

In some instances the fisherman may wish the brake to be held released from the pulley so that the line may be wound up on the pulley at the location the float happens to be. For this purpose there is provided a cam 42, shown best in Figure 2, which is pivoted on the flange 16 of the ring 12 and may be turned by the operator to engage the eye 41 of the brake and hold the brake rocked to the released position shown in Figure 3.

Preferably the brake is formed of spring material so that it will be flexible in braking the pulley, and may be formed in other ways than just described.

In operation, when reeling in the bait, with the brake in use, the brake will be automatically released by contact of the eye 41 with the tip of the casting rod 43, as shown in Figure 8. The pulley is then free to be rotated during further reeling of the line by the fisherman to wind the sinker end of the line upon the pulley until the sinker is raised to the float to permit casting or retrieving the bait.

It will be evident that the normal position of the float on the water disposes the weighted end of the brake at the side of the float to hold the brake released, as shown in Figure 3. However, when the line is reeled in by the fisherman the float will be tipped over through about an angle of 90° so that the eye is then disposed at the top of the float, as shown in Figure 8, to be struck by the tip of the fishing rod to release the brake and permit of the depth portion of the line being reeled up until the sinker reaches the float.

In operation the float is taken apart by turning the sections 10 and 11 in opposite directions to release the lugs 23 from the keyholes 24. The end of the fishing line 20 is then passed through the eye 41 of the rocker arm or brake, then through the gromet 34 on the center flange of the double pulley, then the proper amount of line desired for the depth to fish is pulled through and wound by hand in the right-hand channel of the double pulley, and finally the end of the line is passed through the lower guide 19 whereupon the sinker and hook may be attached and the float is ready for fishing.

It will be observed, from the above description, that the float can be wound up to the sinker and cast in the regular way, and when the cast is made the float will let out a predetermined amount of line desired for depth. It will be further observed that all of the working parts are carried by the section 10 of the float and this promotes ease of handling when the float is taken apart for adjusting different depths or rigging up at the start of fishing.

From the above description it is thought that the construction and operation of my invention will be fully understood without further explanation.

What is claimed is:

1. A fishing float comprising hollow sections, one of the sections being provided with keyholes, studs carried by the other section adapted to engage in the keyholes and removably secure the sections together, interengaging means between the sections for preventing accidental dislodgment of the studs from the keyholes, a double pulley within the enclosure of the sections adapted to alternately receive a coil of the fishing line in each channel thereof, and a brake pivoted intermediate the ends of one of the sections and having a guide eye outside of the section engaging the fishing line and having a detent on the end opposite the eye adapted to engage the pulley when the fishing line is tensioned and prevent rotation of the pulley.

2. A fishing float comprising hollow sections removably secured together and provided with entrance and exit openings for a fishing line arranged approximately 90° apart, a double pulley rotatably mounted for movement in both directions within the enclosure of the sections and adapted to alternately receive a plurality of turns of the fishing line in each channel thereof, said pulley having a gromet for guiding the fishing line from one channel to the other channel of the double pulley, and a pivoted brake carried by one of the sections provided at one end with a detent adapted to engage the pulley and prevent rotation thereof and provided at the opposite end with a guide eye for receiving the fishing line outside of the entrance opening of the float.

3. A fishing float comprising complementary hollow sections, interengaging means carried by the sections for removably securing the sections together, a double pulley rotatably mounted in the enclosure of the sections and having a central flange provided with an opening therethrough, there being guide openings formed in one of the sections disposed approximately 90° apart to facilitate training a fishing line into the float, through said opening in the pulley and on to one side of the pulley and thence out of the float, and a pivoted resilient rocker arm constituting a brake and pivoted intermediate the ends on one of the sections, one end of the rocker arm projecting through the opening by which the fishing line enters the float and being equipped outside of said opening with a guide eye receiving the fishing line, said brake having a detent disposed at the opposite end adapted to engage said central flange of the pulley when the brake is rocked on its pivot by tension upon the fishing line and prevent rotation of the pulley.

EDGAR B. THOMAS. [L. S.]